US012003807B2

(12) United States Patent
Kang et al.

(10) Patent No.: US 12,003,807 B2
(45) Date of Patent: Jun. 4, 2024

(54) ELECTRONIC DEVICE FOR REMOVING ADVERTISEMENT THUMBNAIL FROM DISPLAY SCREEN FOR PROVIDING LIST OF LIVE SPORTS AND OPERATING METHOD THEREOF

(71) Applicant: NAVER CORPORATION, Gyeonggi-do (KR)

(72) Inventors: Kyung Tae Kang, Seongnam-si (KR); Jun Bong Baek, Seongnam-si (KR); Dongho Lee, Asan-si (KR); Hyungwoo Kim, Seongnam-si (KR)

(73) Assignee: NAVER Corporation, Gyeonggi-do (KR)

( * ) Notice: Subject to any disclaimer, the term of this patent is extended or adjusted under 35 U.S.C. 154(b) by 0 days.

(21) Appl. No.: 17/502,293

(22) Filed: Oct. 15, 2021

(65) Prior Publication Data
US 2022/0124402 A1 Apr. 21, 2022

(30) Foreign Application Priority Data
Oct. 16, 2020 (KR) .......................... 10-2020-0134377

(51) Int. Cl.
*H04N 21/431* (2011.01)
*G06F 18/2433* (2023.01)
*H04N 21/454* (2011.01)

(52) U.S. Cl.
CPC ..... *H04N 21/4316* (2013.01); *G06F 18/2433* (2023.01); *H04N 21/454* (2013.01)

(58) Field of Classification Search
CPC ............. H04N 21/4316; H04N 21/454; H04N 21/44008; H04N 21/466; H04N 21/812; H04N 21/2187; H04N 21/4886; H04N 21/4312; H04N 21/8126; G06K 9/6284;
(Continued)

(56) References Cited

U.S. PATENT DOCUMENTS 10,628,680 B2 * 4/2020 Babenko ................ G06V 20/46
2016/0269794 A1 * 9/2016 Shimura ............ H04N 21/4316
2017/0289617 A1 10/2017 Song et al.
(Continued)

FOREIGN PATENT DOCUMENTS

KR 10-2004-0070269 A 8/2004
KR 10-2015-0128010 A 11/2015

OTHER PUBLICATIONS

Korean Office Action dated Nov. 29, 2021 issued in corresponding Korean Patent Application No. 10-2020-0134377.

*Primary Examiner* — Nathan J Flynn
*Assistant Examiner* — Christine A Kurien
(74) *Attorney, Agent, or Firm* — Harness, Dickey & Pierce, P.L.C.

(57) ABSTRACT

Provided are an electronic device for removing an advertisement thumbnail from a display screen for providing a list of sports and an operating method of the electronic device that may retrieve an image thumbnail extracted from a game video being broadcast live, determine whether the image thumbnail is a game thumbnail or an advertisement thumbnail using a pre-trained deep learning model, and display the game thumbnail on a display screen when the image thumbnail is the game thumbnail and remove the advertisement thumbnail on the display screen when the image thumbnail is the advertisement thumbnail.

13 Claims, 10 Drawing Sheets

(58) Field of Classification Search
CPC ........ G06V 10/82; G06V 20/42; G06V 20/46; G06V 20/40
See application file for complete search history.

(56) References Cited

U.S. PATENT DOCUMENTS

| | | | |
|---|---|---|---|
| 2018/0316940 A1* | 11/2018 | Todd | H04N 21/4786 |
| 2019/0138553 A1* | 5/2019 | Maharajh | G06F 16/7867 |
| 2020/0057821 A1* | 2/2020 | Tagra | G06V 20/49 |
| 2021/0026884 A1* | 1/2021 | Mahajan | G06F 16/7837 |
| 2021/0344991 A1* | 11/2021 | Todd | H04N 21/4438 |

* cited by examiner

RELATED ART

ELECTRONIC DEVICE FOR REMOVING ADVERTISEMENT THUMBNAIL FROM DISPLAY SCREEN FOR PROVIDING LIST OF LIVE SPORTS AND OPERATING METHOD THEREOF

CROSS-REFERENCE TO RELATED APPLICATION(S)

This U.S. non-provisional application and claims the benefit of priority under 35 U.S.C. § 119 to Korean Patent Application No. 10-2020-0134377, filed Oct. 16, 2020, the entire contents of which are incorporated herein by reference in their entirety.

BACKGROUND

Technical Field

One or more example embodiments relate to electronic devices for removing an advertisement thumbnail from a display screen for providing a list of sports being broadcast live and/or operating methods of the electronic device.

Related Art

In general, at least one sport is broadcast live and a user views a game video for a desired sport through an electronic device. Here, there is a service that provides a list of live sports on a display screen of the electronic device, such that the user may select a desired sport. An image thumbnail for a game video of each sport is displayed as an in-list item on the display screen. Here, for each sport, an image thumbnail is acquired as a corresponding game video is captured at a desired (or alternatively, preset) time interval and is changed at a desired (or alternatively, preset) time interval on the display screen accordingly. Here, an advertising video is inserted in the game video. Therefore, the image thumbnail includes a game thumbnail acquired from the real game video and an advertisement thumbnail acquired from the advertising video. Therefore, the advertisement thumbnail as well as the game thumbnail are displayed on the display screen. However, the user for the display screen may not verify information about the game video from the above advertisement thumbnail. That is, the advertisement thumbnail displayed on the display screen may be insignificant to the user.

SUMMARY

Some example embodiments provide electronic devices for removing an advertisement thumbnail from a display screen for providing a list of sports being broadcast live, that is, live sports and/or operating methods of the electronic device.

According to an aspect of at least one example embodiment, an operating method of an electronic device may include retrieving an image thumbnail extracted from a game video being broadcast live, in response to the image thumbnail being a game thumbnail, displaying the game thumbnail on a display screen, and in response to the image thumbnail being an advertisement thumbnail, removing the advertisement thumbnail on the display screen.

According to an aspect of at least one example embodiment, a non-transitory computer-readable record medium storing instructions that, when executed by a processor, cause an electronic device to perform the aforementioned method.

According to an aspect of at least one example embodiment, an electronic device may include a memory and a processor configured to connect to the memory and to execute at least one instruction stored in the memory. The processor may be configured to retrieve an image thumbnail extracted from a game video being broadcast live, display the game thumbnail on a display screen in response to the image thumbnail being a game thumbnail, and remove the advertisement thumbnail on the display screen in response to the image thumbnail being an advertisement thumbnail.

According to some example embodiments, an electronic device may display only a game thumbnail without displaying an advertisement thumbnail on a display screen for providing a list of sports being broadcast live. Therefore, a user for the display screen may quickly verify information about a live sport through the game thumbnail and may not view an insignificant advertisement thumbnail. Here, the electronic device may more accurately and efficiently classify the image thumbnail into the game thumbnail or the advertisement thumbnail using a pre-trained deep learning model.

Further areas of applicability will become apparent from the description provided herein. The description and specific examples in this summary are intended for purposes of illustration only and are not intended to limit the scope of the present disclosure.

DETAILED DESCRIPTION

Figure 1A:
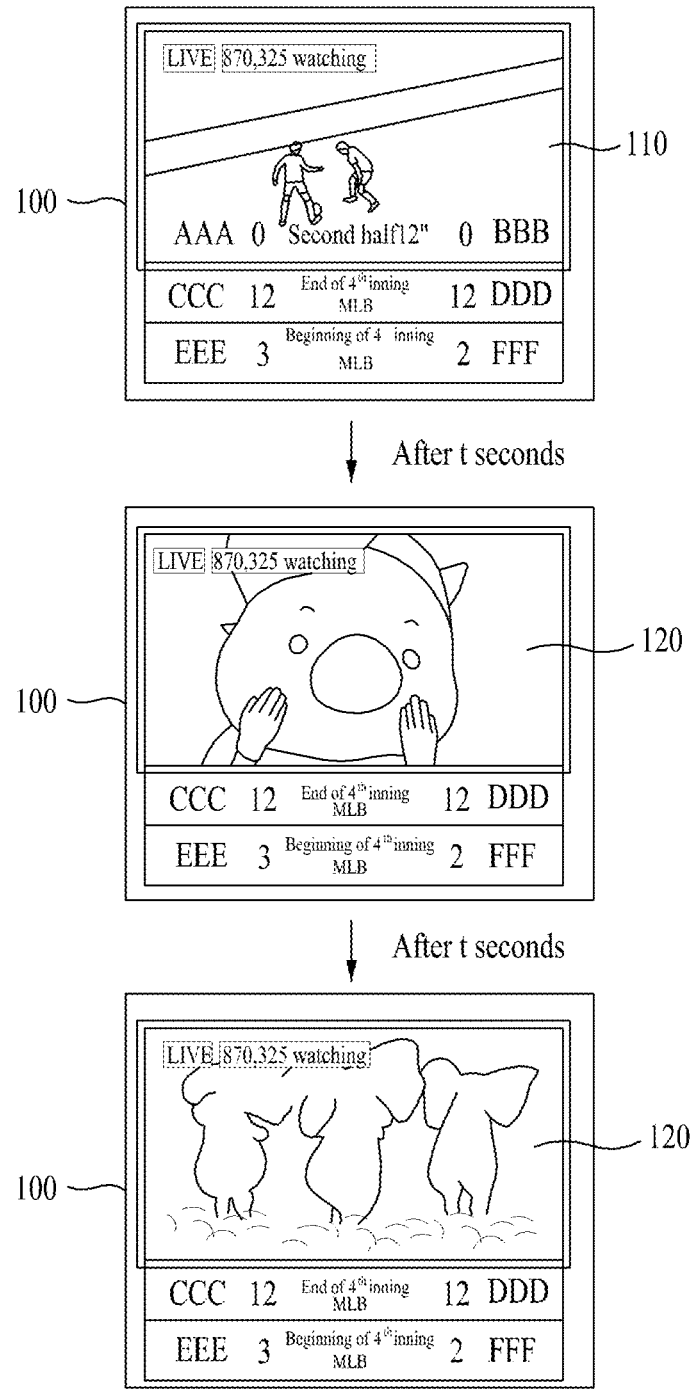
FIGS. 1A and 1B illustrate examples of describing an operation feature of an electronic device according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Figure 1B:
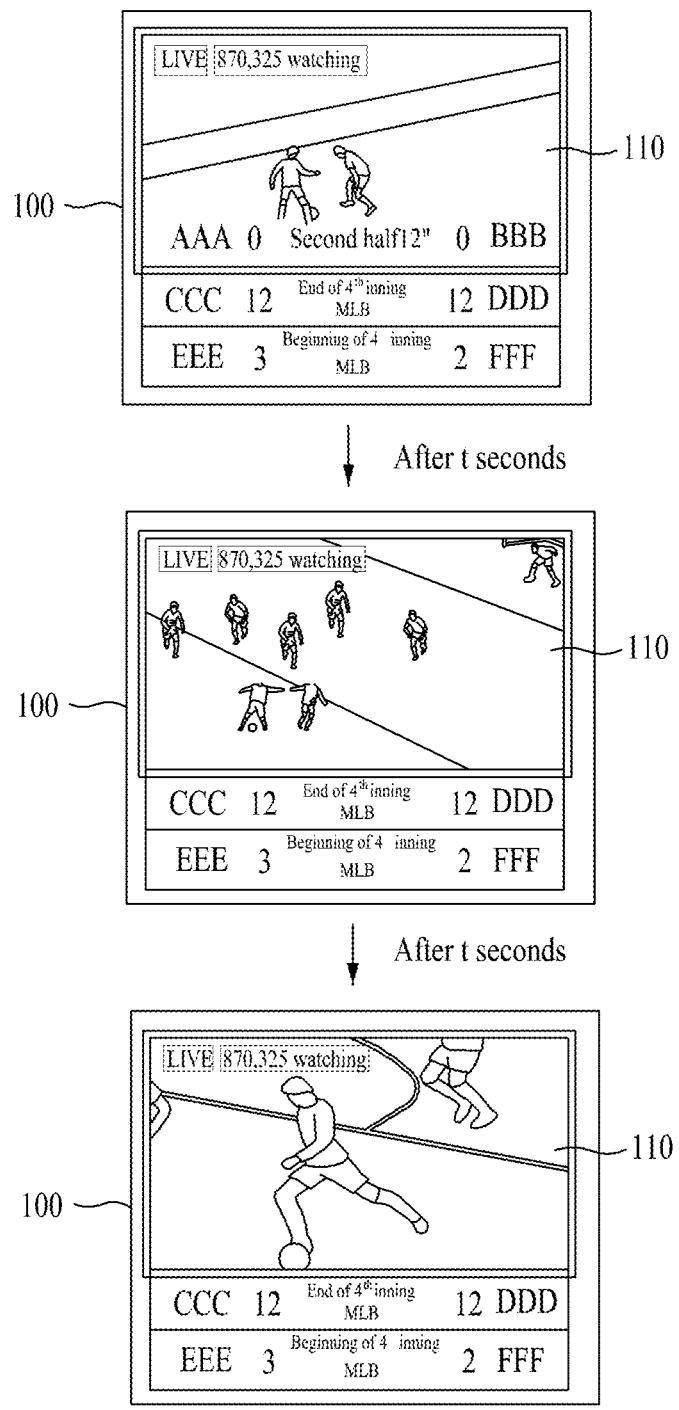

FIGS. 1A and 1B illustrate examples of describing an operation feature of an electronic device (200 of FIG. 2) according to at least one example embodiment. FIGS. 1A and 1B illustrates a display screen 100 for providing a list of sports being broadcast live. Here, FIG. 1A illustrate examples of image thumbnails (110, 120) displayed on the existing display screen 100 and FIG. 1B illustrate examples of image thumbnails (110) displayed on the display screen 100 according to at least one example embodiment.

Referring to FIGS. 1A and 1B, the image thumbnails (110, 120) may be displayed on the display screen 100. For example, the different image thumbnails (110, 120) may be displayed on the display screen 100 at a desired (or alternatively, preset) time interval. That is, one of the image thumbnails (110, 120) may be initially displayed and the other one of the image thumbnails (110, 120) may be displayed, for example, if t seconds elapses. Here, the image thumbnails (110, 120) are extracted over time from a game video being broadcast live (hereinafter, a live game video), and thus may include not only game thumbnails 110 but also advertisement thumbnails 120. Therefore, although FIG. 1A illustrates that the game thumbnails 110 and the advertisement thumbnails 120 are displayed on the display screen 100, FIG. 1B illustrates that the advertisement thumbnails 120 are removed from the display screen 100. That is, only the game thumbnails 110 may be displayed on the display screen 100 without displaying the advertisement thumbnails 120.

Figure 2:
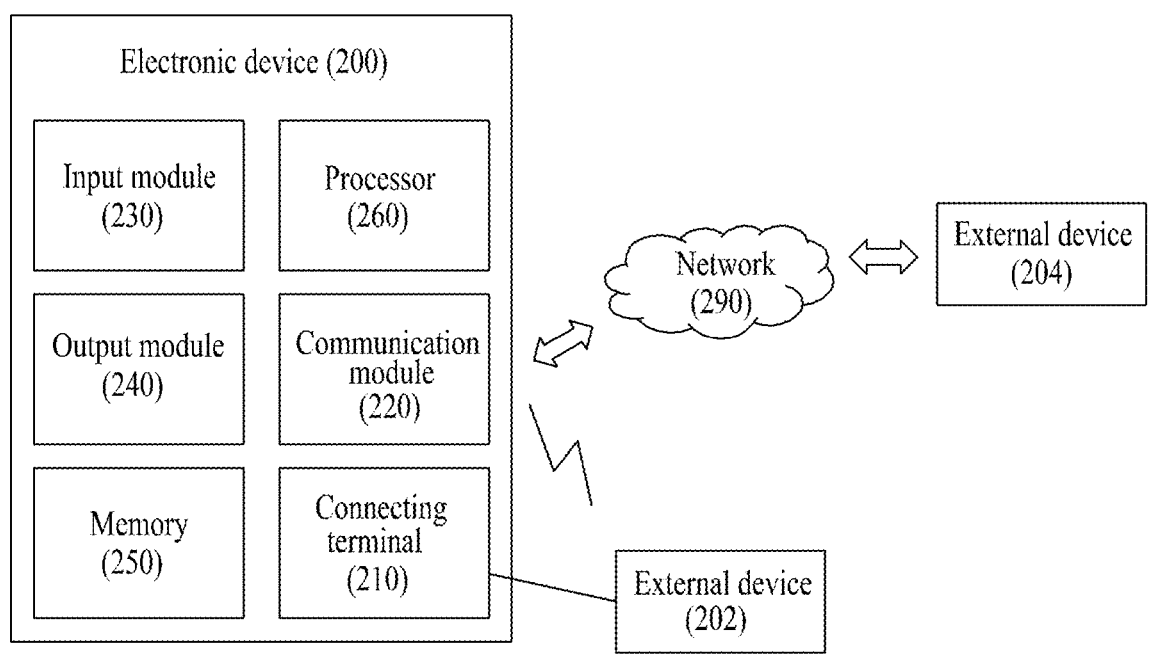
FIG. 2 is a diagram illustrating an electronic device according to at least one example embodiment.
Figure 3:
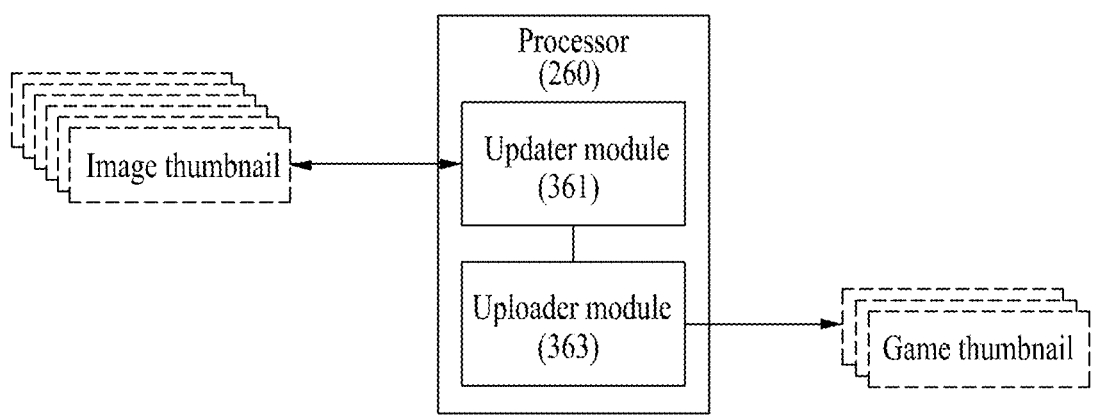
FIG. 3 illustrates an example of a processor of FIG. 2.
Figure 4:
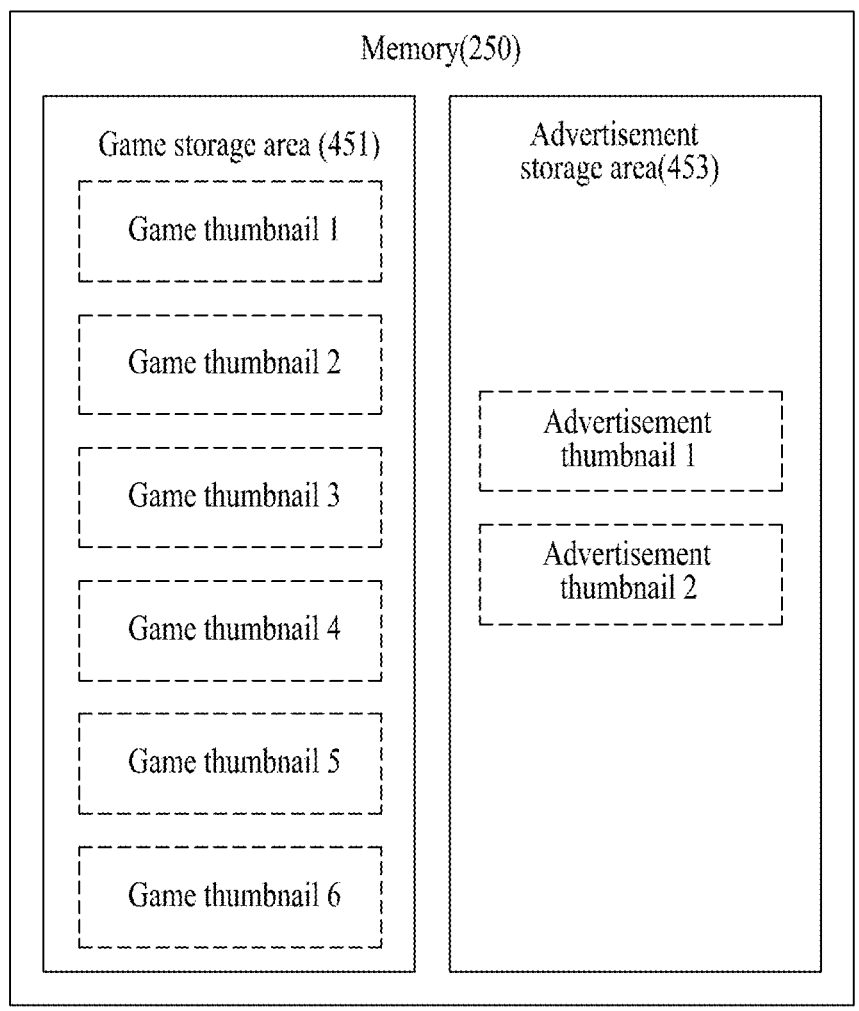
FIGS. 4 and 5 illustrate examples of a memory of FIG. 2.
Figure 5:
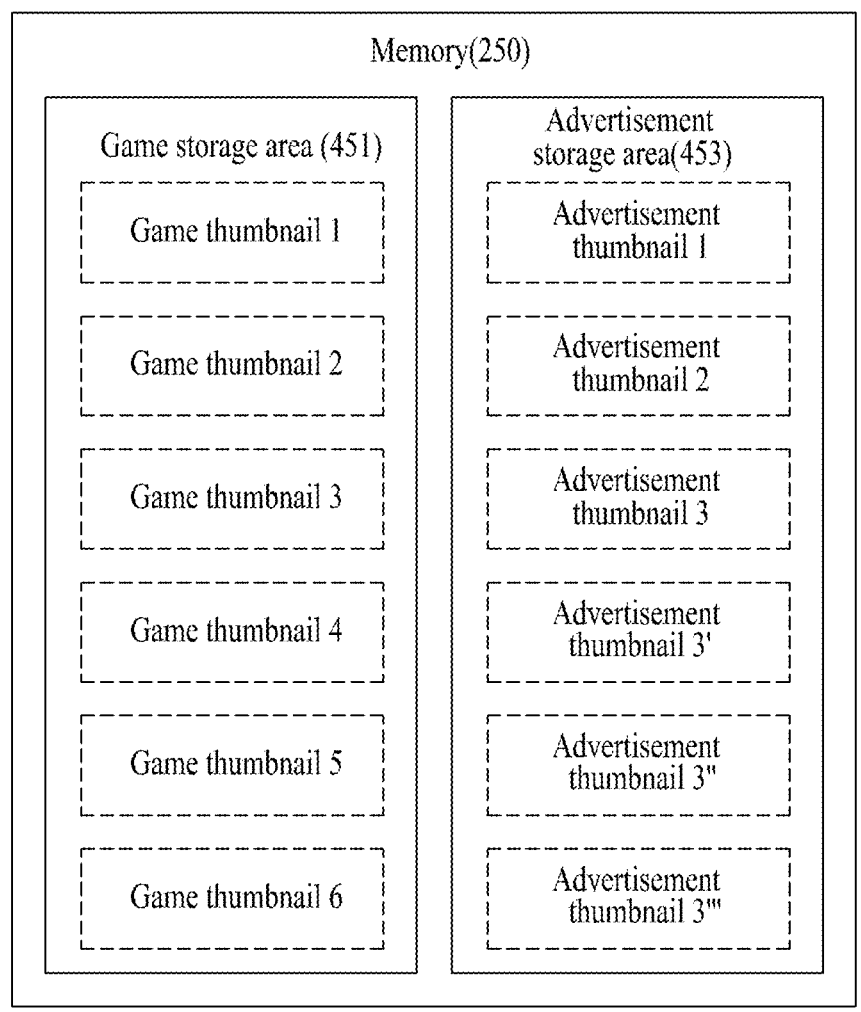
Figure 6:
FIGS. 6 and 7 illustrate examples of describing a partial operation of the processor of FIG. 2.
Figure 7:
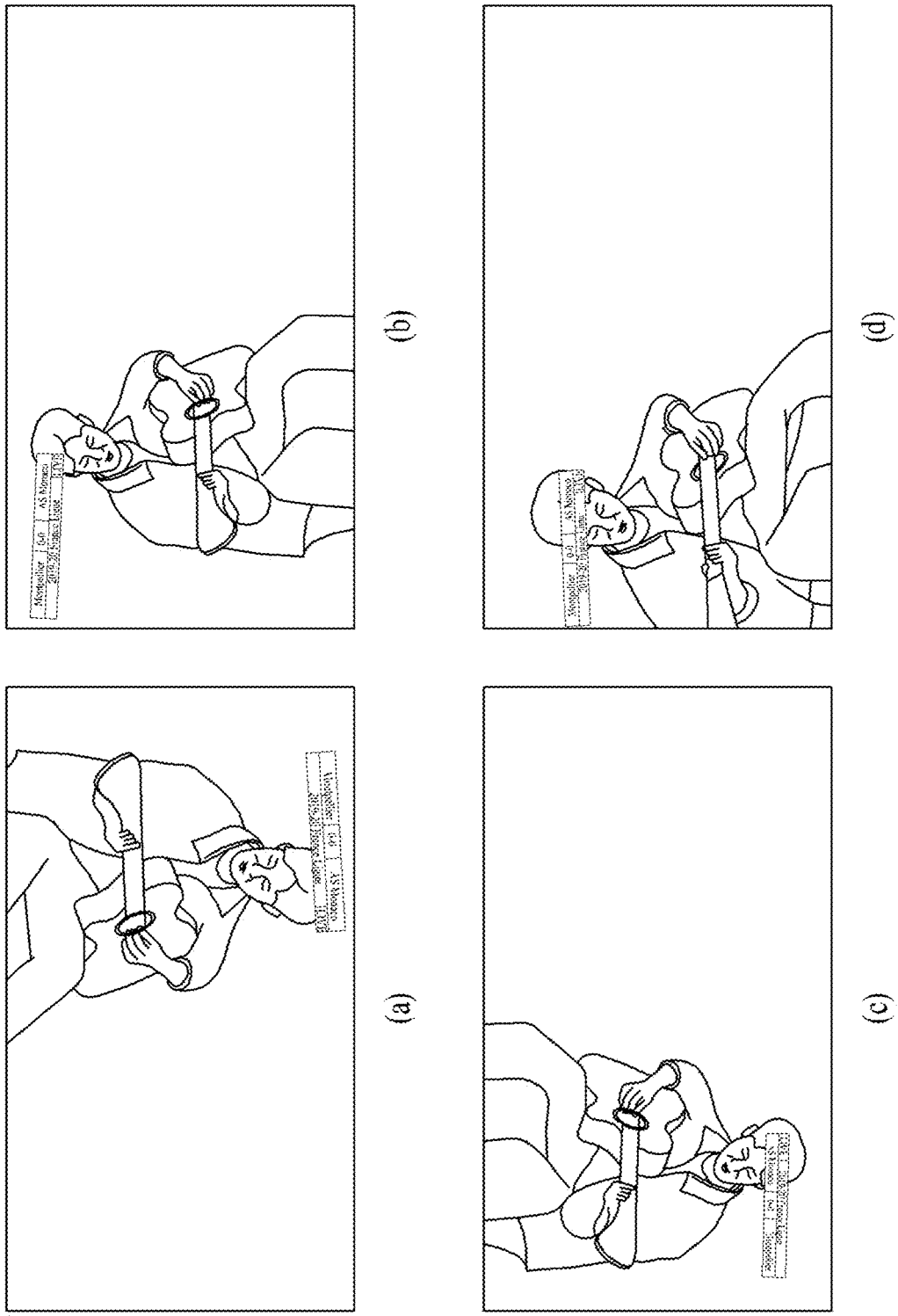

FIG. 2 is a diagram illustrating the electronic device 200 according to at least one example embodiment. FIG. 3 illustrates an example of a processor 260 of FIG. 2. FIGS. 4 and 5 illustrate examples of a memory 250 of FIG. 2. FIGS. 6 and 7 illustrate examples of describing a partial operation of the processor 260 of FIG. 2

Referring to FIG. 2, the electronic device 200 according to at least one example embodiment may include at least one of a connecting terminal 210, a communication module 220, an input module 230, an output module 240, the memory 250, and the processor 260. Depending on example embodiments, at least one component may be omitted from among components of the electronic device 200 and at least one another component may be added thereto. Depending on example embodiments, at least two of the components of the electronic device 200 may be configured into a single integrated circuitry. Here, the electronic device 200 may include a server.

The connecting terminal 210 may be physically connected to an external device 202. For example, the electronic device 202 may include another electronic device. To this end, the connecting terminal 210 may include at least one connector. For example, the connector may include at least one of a high-definition multimedia interface (HDMI) connector, a universal serial bus (USB) connector, a secure digital (SD) card connector, and an audio connector.

The communication module 220 enables the electronic device 200 to communicate with external devices 202 and 204. The communication module 220 may allow the electronic device 200 to establish communication channels with the external devices 202 and 204 and to communicate with the external devices 202 and 204 through the corresponding communication channel. Here, the communication module 220 may include at least one of a wired communication module and a wireless communication module. The wired communication module may be connected to the external device 202 in a wired manner through the connecting terminal 202 and may communicate with the external device 202 in the wired manner. The wireless communication module may include at least one of a near field communication module and a far field communication module. The near field communication module may communicate with the external device 202 using a near field communication method. For example, the near field communication method may include at least one of Bluetooth, wireless fidelity (WiFi) direct, and infrared data association (IrDA). The far field communication module may communicate with the external device 204 using a far field communication method. Here, the far field communication module may communicate with the external device 204 over a network 290. For example, the network 290 may include at least one of a cellular network, the Internet, and a computer network such as a local area network (LAN) and a wide area network (WAN).

Here, the external device 202, 204 may include at least one of another server, another electronic device, a satellite, and a base station. For example, the other electronic device may include at least one of a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a home appliance, a medical device, and a robot.

The input module 230 may input a signal to be used for at least one component of the electronic device 200. The input module 230 may include at least one of an input device configured for the user to directly input a signal to the electronic device 200, a sensor device configured to detect an ambient environment and to create a signal, and a camera module configured to capture an image and to create image data. For example, the input device may include at least one of a microphone, a mouse, and a keyboard. Depending on example embodiments, the sensor device may include at least one of touch circuitry configured to detect a touch and sensor circuitry configured to measure strength of force occurring due to the touch.

The output module 240 may output information. The output module 140 may include at least one of a display module configured to visually display information and an audio module configured to auditorily reproduce information. For example, the display module may include at least one of a display, a hologram device, and a projector. For example, the display module may be configured as a touchscreen assembly, which includes at least one of the sensor circuitry and the touch circuitry of the input module 230. For example, the audio module may include at least one of a speaker and a receiver.

The memory 250 may store a variety of data used by at least one component of the electronic device 200. For example, the memory 250 may include at least one of a volatile memory and a non-volatile memory. Data may include at least one program and input data or output data related thereto. The program may be stored in the memory 250 as software including at least one instruction and may include, for example, at least one of an OS, middleware, and an application.

The processor 260 may control at least one component of the electronic device 200 by executing the program of the memory 250. Through this, the processor 260 may perform data processing or operation. Here, the processor 260 may execute an instruction stored in the memory 250.

The processor 260 may classify each image thumbnail (110, 120) extracted from the live game video into the game thumbnail 110 or the advertisement thumbnail 120. Here, the processor 260 may classify each image thumbnail (110, 120) into the game thumbnail 110 or the advertisement thumbnail 120 through a binary classification scheme using a pre-trained deep learning model. Here, the pre-trained deep learning model may be present for each event. For example, the pre-trained deep learning model may be present for each of soccer, baseball, golf, etc. That is, the pre-trained deep learning model may be trained using a game video corresponding to a desired live event (e.g., sport) as training data. The pre-trained deep learning model may include a preprocessing model and a classification model. The processor 260 may display only the game thumbnail 110 as an in-list item on the display screen 100, without displaying the advertisement thumbnail 120.

According to an example embodiment, as illustrated in FIG. 3, the processor 260 may include an updater module 361 and an uploader module 363.

The updater module 361 may retrieve one of the plurality of image thumbnails (110, 120) at a desired (or alternatively, preset) time interval. For example, the desired (or alternatively, preset) time interval may be about 1 minute. According to an example embodiment, the plurality of image thumbnails (110, 120) being extracted over time from the live game video may be stored in the memory 250. Here, the image thumbnails (110, 120) may be extracted from the game video by the processor 260, or may be extracted from the game video by the external devices 202 and 204 and received from the external devices 202 and 204. In this case, the updater module 361 may retrieve one of the image thumbnails (110, 120) from the memory 250. According to another example embodiment, the plurality of image thumbnails (110, 120) being extracted over time from the live game video may be stored in the external devices 202 and 204. In this case, the updater module 361 may retrieve one of the image thumbnails (110, 120) from the external devices 202 and 204. For example, each of the external devices 202 and 204 may be a server such as a contents delivery network (CDN) server.

The updater module 361 may determine whether the retrieved image thumbnail (110, 120) is the game thumbnail 110 or the advertisement thumbnail 120 using the pre-trained deep learning model. For example, the updater module 361 may be referred to as a common central cluster deep learning (C3DL) updater. Here, the preprocessing model may extract at least one feature point from the retrieved image thumbnail (110, 120). For example, the preprocessing model may be implemented in a structure of a convolution neural network (CNN). Also, the classification model may analyze the feature point and may determine whether the retrieved image thumbnail (110, 120) is the game thumbnail 110 or the advertisement thumbnail 120. For example, the classification model may be implemented in a structure of logistic regression (LR) or a deep neural network (DNN). Here, when the retrieved image thumbnail (110, 120) is the game thumbnail 110, the updater module 361 may upload the game thumbnail 110 to the uploader module 363. Further, when the retrieved image thumbnail (110, 120) is the advertisement thumbnail 120, the updater module 361 may remove the advertisement thumbnail 120 without uploading the advertisement thumbnail 120 to the uploader module 363. Thus, less computing resources may be desired for the uploading operation, and thus less power may be consumed for the uploading operation.

The uploader module 363 may upload the game thumbnail 110 for the display screen 100. That is, the uploader module 363 may upload the game thumbnail 110 such that the game thumbnail 110 may be displayed on the display screen 100. According to an example embodiment, the electronic device 200 may be a server that directly provides the display screen 100. In this case, the uploader module 363 may upload the game thumbnail 110 to directly process the game thumbnail 110. According to another example embodiment, the external device 202, 204 may be a server that provides the display screen 100. In this case, the uploader module 363 may upload the game thumbnail 110 to the external device 202, 204.

According to some example embodiments, the processor 260 may implement the pre-trained deep learning model by training the deep learning model. Here, the pre-trained deep learning model may include the preprocessing model and the classification model.

The processor 260 may acquire the plurality of image thumbnails (110, 120) extracted from the game video. The processor 260 may classify the image thumbnails (110, 120) into the game thumbnails 110 and the advertisement thumbnails 120. To this end, two classes may be defined in association with the game video. The processor 260 may allocate the game thumbnails 110 and the advertisement thumbnails 120 to the respective classes. Further, the processor 260 may assign different annotations to the respective classes. That is, the processor 260 may assign different annotations to the game thumbnails 110 and the advertisement thumbnails 120.

According to an example embodiment, referring to FIGS. 4 and 5, the memory 250 may include a game storage area 451 and an advertisement storage area 453. As indicated by a user of the electronic device 200, the processor 260 may store the game thumbnails 110, for example, game thumbnail 1, game thumbnail 2, and the like, in the game storage area 451 and may store the advertisement thumbnails 120, for example, advertisement thumbnail 1, advertisement thumbnail 2, and the like, in the advertisement storage area 453. Here, if a ratio of the number of game thumbnails 110 to the number of advertisement thumbnails 120 exceeds a desired (or alternatively, preset) range as illustrated in FIG. 4, the processor 260 may increase the number of advertisement thumbnails 120 in the advertisement storage area 453 as illustrated in FIG. 5, based on a data augmentation scheme. For example, the processor 260 may apply at least one of rotation, shift, zoom in/out, and flip to at least one of the advertisement thumbnails 120 as illustrated in FIG. 6 and may generate at least one advertisement thumbnail 120 as illustrated in (a), (b), (c), and (d) of FIG. 7. Here, the processor 260 may increase the number of advertisement thumbnails 120 such that a ratio of the number of game thumbnails 110 to the number of advertisement thumbnails 120 may be less than or equal to a desired (or alternatively, preset) range. For example, the number of game thumbnails 110 and the number of advertisement thumbnails 120 may become identical or similar to each other.

The processor 260 may train the deep learning model based on the game thumbnails 110 and the advertisement thumbnails 120. Here, the processor 260 may train the deep learning model based on a portion of the game thumbnails 110 and a portion of the advertisement thumbnails 120. For example, the processor 260 may train the deep learning model based on 80% of the game thumbnails 110 and 80% of the advertisement thumbnails 120. Here, the preprocessing model and the classification model may be individually trained. The preprocessing model may extract at least one feature point from each of some game thumbnails 110 and may extract at least one feature point from each of some advertisement thumbnails 120. The classification model may analyze feature points and may implement a learning algorithm for classifying some game thumbnails 110 and some advertisement thumbnails 120.

Also, the processor 260 may run a test on the trained deep learning model. Here, the processor 260 may run the test on the trained deep learning model based on the remaining game thumbnails 110 and the remaining advertisement thumbnails 120. For example, the processor 260 may run the test on the trained deep learning model based on 20% of the game thumbnails 110 and 20% of the advertisement thumbnails 120. Here, the test may be run on each of the preprocessing model and the classification model. The preprocessing model may extract at least one feature point from each of the remaining game thumbnails 110 and may extract at least one feature point from each of the remaining advertisement thumbnails 120. The classification model may analyze feature points and may classify the remaining game thumbnails 110 and the remaining advertisement thumbnails 120. Through this, the processor 260 may verify an operation accuracy of the trained deep learning model. Therefore, whether to use the trained deep learning model may be determined based on the operation accuracy.

For example, to select an optimal trained deep learning model, a plurality of candidate deep learning models may be trained. Referring to the following Table 1, four candidate preprocessing models and two candidate classification models of Keras platform may be trained. An operation accuracy for each of combinations of the candidate preprocessing models and the candidate classification models may be verified. According to the following Table 1, a combination of candidate preprocessing model 1 and candidate classification model 1 has a highest operation accuracy of 99.60%, which may represent that the electronic device 200 may have an optimal performance when using the trained deep learning model of the corresponding combination. Through this, the optimal trained deep learning model may be selected and used.

TABLE 1

| | Candidate classification model 1 (LR) | Candidate classification model 2 (DNN) |
|---|---|---|
| Candidate preprocessing model 1 (InceptoinResNetV2) | 99.60 | 99.54 |
| Candidate preprocessing model 2 (Xception) | 96.20 | 98.73 |
| Candidate preprocessing model 3 (ResNet152V2) | 99.58 | 99.43 |
| Candidate preprocessing model 4 (MobileNet) | 99.47 | 99.54 |

According to some example embodiments, the processor 260 may receive the pre-trained deep learning model from the external device 202, 204 without directly training the deep learning model. Here, the pre-trained deep learning model may be implemented by operating the external device 202, 204 on behalf of the processor 260. Through this, the processor 260 may receive and use the optimal trained deep learning model from the external device 202, 204.

Figure 8:
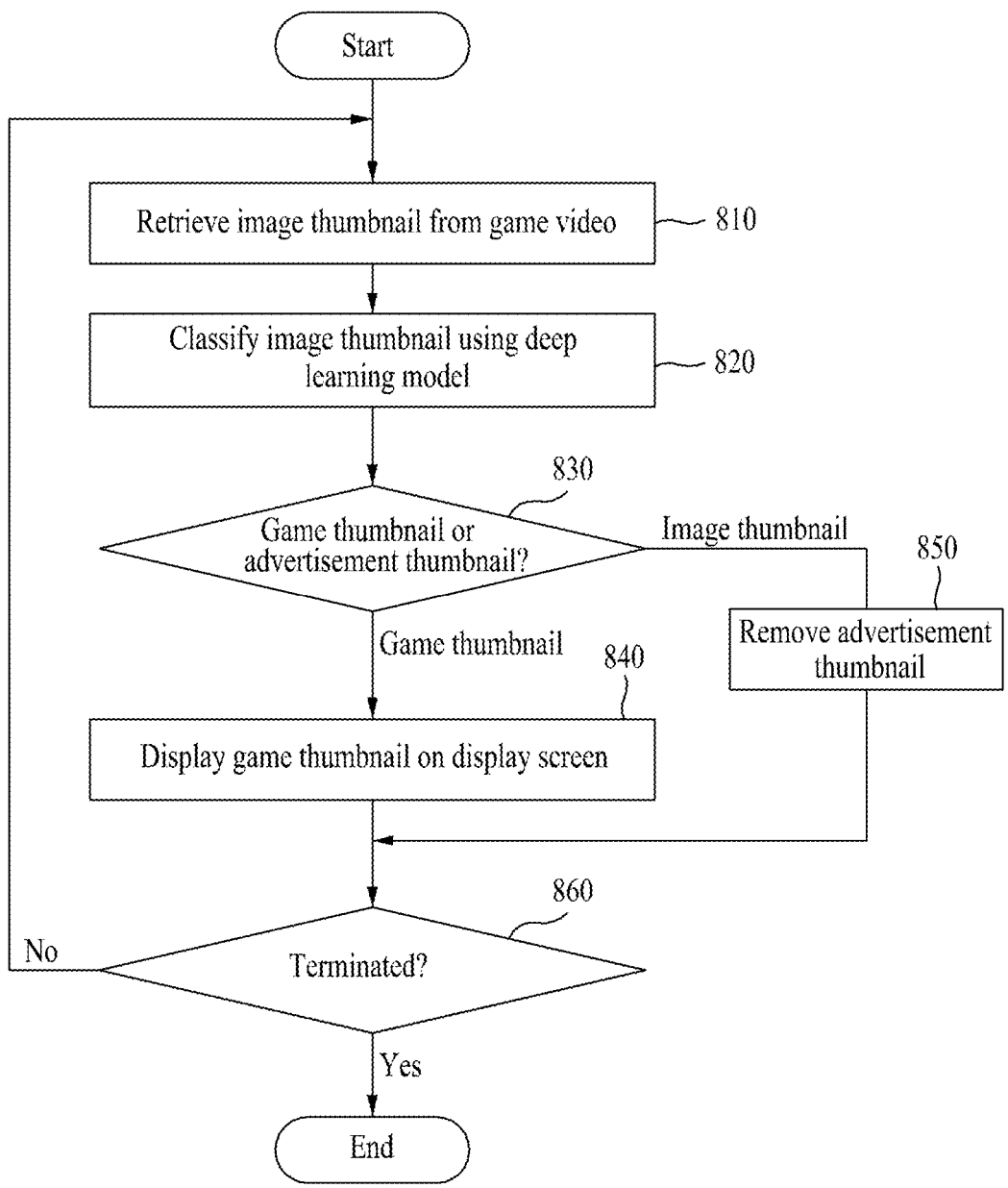
FIGS. 8 and 9 are flowcharts illustrating examples of an operating method of an electronic device according to some example embodiments.

FIG. 8 is a flowchart illustrating an example of an operating method of the electronic device 200 according to at least one example embodiment. For example, FIG. 8 may represent an operating method of the electronic device 200 using a pre-trained deep learning model.

Referring to FIG. 8, in operation 810, the electronic device 200 may retrieve the image thumbnail (110, 120) extracted from a game video being broadcast live, that is, a live game video. Here, the processor 260 may retrieve one of a plurality of image thumbnails (110, 120). According to an example embodiment, the plurality of image thumbnails (110, 120) extracted over time from the live game video may be stored in the memory 250. Here, the image thumbnails (110, 120) may be extracted from the game video by the processor 260, or may be extracted from the game video by the external devices 202 and 204 and received from the external devices 202 and 204. In this case, the processor 260 may retrieve one of the image thumbnails (110, 120) from the memory 250. According to another example embodiment, the plurality of image thumbnails (110, 120) extracted over time from the live game video may be stored in the external devices 202 and 204. In this case, the processor 260 may retrieve at least one of the image thumbnails (110, 120) from the external devices 202 and 204.

In operation 820, the electronic device 200 may classify the retrieved image thumbnail (110, 120) using a pre-trained deep learning model. Here, the processor 260 may classify the retrieved image thumbnail (110, 120) into the game thumbnail 110 or the advertisement thumbnail 120 using the pre-trained deep learning model. Here, the pre-trained deep learning model may include a preprocessing model and a classification model. The preprocessing model may extract at least one feature point from the retrieved image thumbnail (110, 120) The classification model may analyze the feature point and may classify the retrieved image thumbnail (110, 120) into the game thumbnail 110 or the advertisement thumbnail 120. Through this, in operation 830, the electronic device 200 may determine whether the image thumbnail (110, 120) is the game thumbnail 110 or the advertisement thumbnail 120.

When the image thumbnail (110, 120) is determined as the game thumbnail 110 in operation 830, the electronic device 200 may display the game thumbnail 110 as an in-list item on the display screen 100 for displaying a list of sports being broadcast live in operation 840. Here, the processor 260 may upload the game thumbnail 110 such that the game thumbnail 110 may be displayed on the display screen 100. According to an example embodiment, the electronic device 200 may be a server that directly provides the display screen 100. In this case, the processor 260 may upload the game thumbnail 110 to directly process the game thumbnail 110. According to another example embodiment, the external device 202, 204 may be a server that provides the display screen 100. In this case, the processor 260 may upload the game thumbnail 110 to the external device 202, 204.

When the image thumbnail (110, 120) is determined as the advertisement thumbnail 120, the electronic device 200 may remove the advertisement thumbnail 120 in operation 850. That is, the processor 260 may remove the advertisement thumbnail 120 without displaying the advertisement thumbnail 120 as an in-list item on the display screen 100.

In operation 860, the electronic device 200 may determine whether to terminate a service related to the corresponding game video. For example, the processor 260 may determine whether the live game video is terminated or stopped. As another example, the processor 260 may determine whether a request for terminating the display screen 100 is received from the external device 202, 204.

Unless the service related to the corresponding game video is terminated in operation 860, the electronic device 200 may repeatedly perform at least a portion of operations 810 to 860 by returning to operation 810. Here, in operation 810, the processor 260 may retrieve another one of the plurality of image thumbnails (110, 120). Here, the processor 260 may retrieve another one of the plurality of image thumbnails (110, 120) at a desired (or alternatively, preset) time interval. That is, the processor 260 may retrieve the other image thumbnail (110, 120) at a desired (or alternatively, preset) time interval from a point in time at which the previous image thumbnail (110, 120) is retrieved. For example, the desired (or alternatively, preset) time interval may be about 1 minute. Through this, the processor 260 may perform at least a portion of operations 820 to 860 on the other image thumbnail (110, 120).

Figure 9:
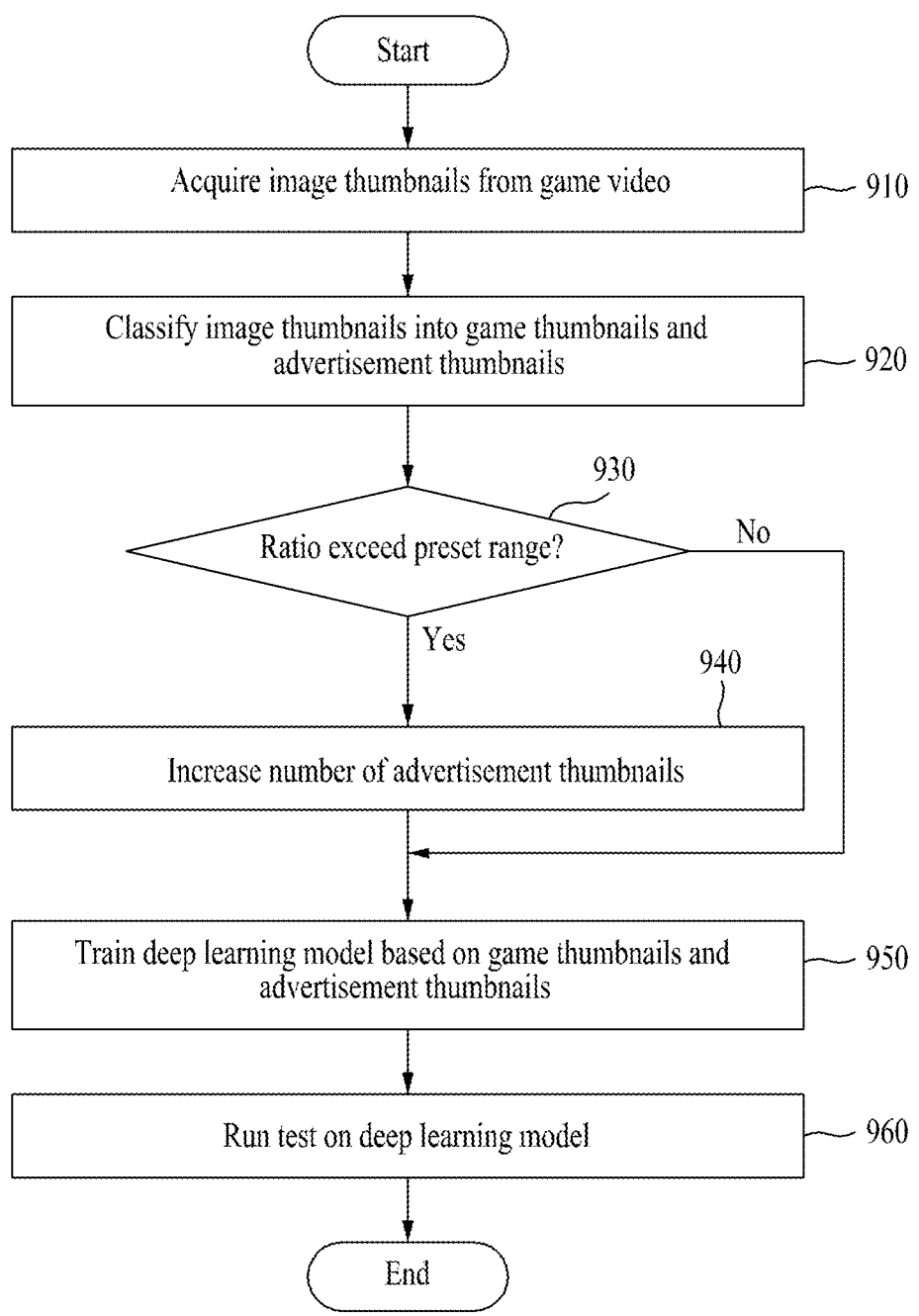

FIG. 9 is a flowchart illustrating an example of an operating method of the electronic device 200 according to at least one example embodiment. For example, FIG. 9 may represent the operating method of the electronic device 200 that implements a pre-trained deep learning model.

Referring to FIG. 9, in operation 910, the electronic device 200 may acquire the plurality of image thumbnails (110, 120) extracted from a game video. Here, the processor 260 may acquire the image thumbnails (110, 120) extracted over time from the game video being broadcast live or the game video of which live broadcast is terminated. According to an example embodiment, the image thumbnails (110, 120) may be stored as training data in the memory 250. Here, the image thumbnails (110, 120) may be extracted from the game video by the processor 260, or may be extracted from the game video by the external devices 202 and 204 and received from the external devices 202 and 204. In this case, the processor 260 may acquire the image thumbnails (110, 120) from the memory 250. According to another example embodiment, the image thumbnails (110, 120) may be stored as training data in the external devices 202 and 204. In this case, the processor 260 may acquire the image thumbnails (110, 120) from another server.

In operation 920, the electronic device 200 may classify the image thumbnails (110, 120) into the game thumbnails 110 and the advertisement thumbnails 120. Here, two classes may be defined in association with the game video. The processor 260 may allocate the game thumbnails 110 and the advertisement thumbnails 120 to the respective classes. Further, the processor 260 may assign different annotations to the respective classes. That is, the processor 260 may assign different annotations to the game thumbnails 110 and the advertisement thumbnails 120. According to an example embodiment, as indicated by the user of the electronic device 200, the processor 260 may store the game thumbnails 110 in the game storage area 451 of one of the classes and may store the advertisement thumbnails 120 in the advertisement storage area 453 of the other one of the classes. Through this, the processor 260 may assign the respective different annotations to the game thumbnails 110 and the advertisement thumbnails 120.

In operation 930, the electronic device 200 may compare a ratio of the number of game thumbnails 110 to the number of advertisement thumbnails 120 with a desired (or alternatively, preset) range. Here, the processor 260 may determine whether the corresponding ratio exceeds the desired (or alternatively, preset) range.

When the corresponding ratio exceeds the desired (or alternatively, preset) range in operation 930, the electronic device 200 may increase the number of advertisement thumbnails 120 in operation 940. Here, the processor 260 may generate at least one advertisement thumbnail 120 based on at least one advertisement thumbnail 120 and a data augmentation scheme. For example, the processor 260 may apply at least one of rotation, shift, zoom in/out, and flip to at least one of the advertisement thumbnails 120 and generate at least one advertisement thumbnail 120. Here, the processor 260 may increase the number of advertisement thumbnails 120 such that a ratio of the number of game thumbnails 110 to the number of advertisement thumbnails 120 may be less than or equal to the desired (or alternatively, preset) range. For example, the number of game thumbnails 110 and the number of advertisement thumbnails 120 may become identical or similar to each other. Through this, the same annotation may be assigned to all the advertisement thumbnails 120.

Here, a portion of the game thumbnails 110 and a portion of the advertisement thumbnails 120 may be allocated to train the deep learning model and the remaining game thumbnails 110 and the remaining advertisement thumbnails 120 may be allocated for a test to be run the trained deep learning model. For example, 80% of the game thumbnails 110 and 80% of the advertisement thumbnails 120 may be allocated to train the deep learning model, and the remaining 20% of the game thumbnails 110 and the remaining 20% of the advertisement thumbnails 120 may be allocated for the test to be run on the trained deep learning model.

In operation 950, the electronic device 200 may train the deep learning model based on the game thumbnails 110 and the advertisement thumbnails 120. Here, if the corresponding ratio is less than or equal to the desired (or alternatively, preset) range in operation 930, the electronic device 200 may train the deep learning model in operation 950. If the corresponding ratio exceeds the desired (or alternatively, preset) range in operation 930, the electronic device 200 may increase the number of advertisement thumbnails 120 in operation 940 and then train the deep learning model in operation 950. Here, the processor 260 may train the deep learning model based on a portion of the game thumbnails 110 and a portion of the advertisement thumbnails 120. Here, the preprocessing model and the classification model may be individually trained. The preprocessing model may extract at least one feature point from each of some game thumbnails 110 and may extract at least one feature point from each of some advertisement thumbnails 120. The classification model may analyze feature points and may implement a learning algorithm for classifying some game thumbnails 110 and some advertisement thumbnails 120.

In operation 960, the electronic device 200 may run a test on the trained deep learning model. Here, the processor 260 may run the test on the trained deep learning model based on the remaining game thumbnails 110 and the remaining advertisement thumbnails 120. Here, the test may be run on each of the preprocessing model and the classification model. The preprocessing model may extract at least one feature point from each of the remaining game thumbnails 110 and may extract at least one feature point from each of the remaining advertisement thumbnails 120. The classification model may analyze feature points and may classify the remaining game thumbnails 110 and the remaining advertisement thumbnails 120. Through this, the processor 260 may verify an operation accuracy of the trained deep learning model. Therefore, whether to use the trained deep learning model may be determined based on the operation accuracy.

According to some example embodiments, the electronic device 200 may display only the game thumbnail 110 without displaying the advertisement thumbnail 120 on the display screen 100. Therefore, the user for the display screen 100 may quickly verify information about the live game video through the game thumbnail 110 and may not view the insignificant advertisement thumbnail 120. Here, the electronic device 200 may more accurately and efficiently classify the image thumbnail (110, 120) into the game thumbnail 110 or the advertisement thumbnail 120 using the pre-trained deep learning model.

The operating method of the electronic device 200 according to some example embodiments may include operation 810 of retrieving the image thumbnail (110, 120) extracted from a game video being broadcast live, operation 840 of, if the image thumbnail (110, 120) is the game thumbnail 110, displaying the game thumbnail 110 on the display screen 100, and operation 850 of, if the image thumbnail (110, 120) is the advertisement thumbnail 120, removing the advertisement thumbnail 120.

According to some example embodiments, the method may further include operations 820 and 830 of determining whether the image thumbnail (110, 120) is the game thumbnail 110 or the advertisement thumbnail 120 using a pre-trained deep learning model.

According to some example embodiments, the pre-trained deep learning model may be implemented through operation 910 of acquiring the plurality of image thumbnails (110, 120) from the game video, operation 920 of classifying the acquired image thumbnails (110, 120) into the game thumbnails 110 and the advertisement thumbnails 120, operation 950 of training the deep learning model based on the classified game thumbnails 110 and advertisement thumbnails 120, and operation 960 of running a test on the pre-trained deep learning model.

According to some example embodiments, the pre-trained deep learning model may be implemented by operation 940 of, if a ratio of the number of classified game thumbnails 110 to the number of classified advertisement thumbnails 120 exceeds a desired (or alternatively, preset) range in operation 930, generating at least one advertisement thumbnail 120 based on at least one of the classified advertisement thumbnails 120 and increasing the number of classified advertisement thumbnails 120, and operation 950 of training the deep learning model based on the number of classified game thumbnails 110 and the increased number of advertisement thumbnails 120.

According to some example embodiments, the pre-trained deep learning model may include the preprocessing model configured to extract at least one feature point from the image thumbnail (110, 120), and the classification model configured to analyze the feature point and to determine whether the image thumbnail (110, 120) is the game thumbnail 110 or the advertisement thumbnail 120.

According to some example embodiments, operation 810 of retrieving the image thumbnail (110, 120) may include retrieving one of the plurality of image thumbnails (110, 120) extracted and stored over time from the game video.

According to some example embodiments, operation 810 of retrieving the image thumbnail (110, 120) may include retrieving one of the image thumbnails (110, 120) at a desired (or alternatively, preset) time interval.

According to some example embodiments, the pre-trained deep learning model may be trained using a game video corresponding to a desired live event (e.g., sport) as training data.

According to some example embodiments, the deep learning model may be trained based on a portion of the classified game thumbnails 110 and the advertisement thumbnails 120 in operation 950.

According to some example embodiments, the test may be run on the pre-trained deep learning model based on the remaining classified game thumbnails 110 and advertisement thumbnails 120 in operation 960.

The electronic device 200 according to example embodiments may include the memory 250 and the processor 260 configured to connect to the memory 240 and to execute at least one instruction stored in the memory 250.

According to example embodiments, the processor 260 may be configured to retrieve the image thumbnail (110, 120) extracted from a game video being broadcast live, if the image thumbnail (110, 120) is the game thumbnail 110, display the game thumbnail 110 on the display screen 100, and, if the image thumbnail (110, 120) is the advertisement thumbnail 120, remove the advertisement thumbnail 120.

According to example embodiments, the processor 260 may be configured to determine whether the image thumbnail (110, 120) is the game thumbnail 110 or the advertisement thumbnail 120 using a pre-trained deep learning model.

According to example embodiments, the pre-trained deep learning model may be implemented by acquiring the plurality of image thumbnails (110, 120) from the game video, classifying the acquired image thumbnails (110, 120) into the game thumbnails 110 and the advertisement thumbnails 120, training the deep learning model based on the classified game thumbnails 110 and advertisement thumbnails 120, and running a test on the pre-trained deep learning model.

According to example embodiments, the pre-trained deep learning model may be implemented by, if a ratio of the number of classified game thumbnails 110 to the number of classified advertisement thumbnails 120 exceeds a desired (or alternatively, preset) range, generating at least one advertisement thumbnail 120 based on at least one of the classified advertisement thumbnails 120 and increasing the number of classified advertisement thumbnails 120, and training the deep learning model based on the classified game thumbnails 110 and the increased number of advertisement thumbnails 120.

According to example embodiments, the pre-trained deep learning model may include the preprocessing model configured to extract at least one feature point from the image thumbnail (110, 120), and the classification model configured to analyze the feature point and to determine whether the image thumbnail (110, 120) is the game thumbnail 110 or the advertisement thumbnail 120.

According to example embodiments, the processor 260 may be configured to retrieve one of the plurality of image thumbnails (110, 120) extracted and stored over time from the game video.

According to example embodiments, the processor 260 may be configured to retrieve one of the image thumbnails (110, 120) at a desired (or alternatively, preset) time interval.

According to example embodiments, the pre-trained deep learning model may be trained using a game video of the same event as that of the game video as training data.

According to example embodiments, the deep learning model may be trained based on a portion of the classified game thumbnails 110 and the advertisement thumbnails 120 and the test may be run on the pre-trained deep learning model based on the remaining classified game thumbnails 110 and advertisement thumbnails 120.

The apparatuses described herein may be implemented using hardware components, software components, and/or a combination of hardware components and software components. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may continuously store programs executable by a computer or may temporally store the same for execution or download. The media may be various record devices or storage devices in a form in which one or a plurality of hardware components is coupled and may be distributed in a network. Examples of the media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions may include a machine language code produced by a compiler and a high-language code executable by a computer using an interpreter. The described hardware devices may be to act as one or more software modules in order to perform the operations of the above-described embodiments, or vice versa.

The example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC), a central processing unit (CPU), an arithmetic logic unit (ALU), a digital signal processor, a microcomputer, a field programmable gate array (FPGA), a System-on-Chip (SoC), a programmable logic unit, a microprocessor, etc.

According to the example embodiments, each component (e.g., module or program) of the aforementioned components may include a singular entity or a plurality of entities. According to the various example embodiments, at least one component among the aforementioned components or operations may be omitted, or at least one another component or operation may be added. Alternately or additionally, the plurality of components (e.g., module or program) may be integrated into a single component. In this case, the integrated component may perform the same or similar functionality as being performed by a corresponding component among a plurality of components before integrating at least one function of each component of the plurality of components. According to the example embodiments, operations performed by a module, a program, or another component may be performed in parallel, repeatedly, or heuristically, or at least one of the operations may be performed in different order or omitted. Alternatively, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An operating method of an electronic device, the method comprising:
   retrieving an image thumbnail extracted from a game video being broadcast live;
   determining whether the image thumbnail is a game thumbnail or an advertisement thumbnail using a pre-trained deep learning model;
   in response to a result of the determining indicating that the image thumbnail is the game thumbnail, displaying the game thumbnail on a display screen; and
   in response to the result of the determining indicating that the image thumbnail is the advertisement thumbnail, removing the advertisement thumbnail on the display screen,
   wherein the pre-trained deep learning model is implemented by,
      acquiring a plurality of image thumbnails from the game video,
      classifying the acquired image thumbnails into game thumbnails and advertisement thumbnails,
      training a deep learning model based on the game thumbnails and advertisement thumbnails, and
      running a test on the pre-trained deep learning model, and wherein the pre-trained deep learning model is implemented by,
         if a ratio of a number of the game thumbnails to a number of the advertisement thumbnails exceeds a range,
            generating at least one advertisement thumbnail based on at least one of the advertisement thumbnails and increasing the number of advertisement thumbnails, and
            training the deep learning model based on the number of the game thumbnails and the increased number of the advertisement thumbnails.

2. The method of claim 1, wherein the pre-trained deep learning model comprises:
   a preprocessing model configured to extract at least one feature point from the image thumbnail; and
   a classification model configured to analyze the feature point and determine whether the image thumbnail is the game thumbnail or the advertisement thumbnail.

3. The method of claim 1, wherein the retrieving comprises retrieving one of the plurality of image thumbnails extracted from the game video and stored over time, the plurality of image thumbnails including the image thumbnail.

4. The method of claim 3, wherein the retrieving comprises retrieving one of the image thumbnails at a time interval.

5. The method of claim 1, wherein the pre-trained deep learning model is trained using another game video corresponding to the same event as that of the game video being broadcast live, as training data.

6. The method of claim 1, wherein
   the deep learning model is trained based on a portion of the game thumbnails and a portion of the advertisement thumbnails, and
   the test is run on the pre-trained deep learning model based on a remaining portion of the game thumbnails and a remaining portion of the advertisement thumbnails.

7. A non-transitory computer-readable record medium storing instructions that, when executed by a processor, cause an electronic device to perform the method of claim 1.

8. An electronic device comprising:
   a memory; and
   a processor configured to connect to the memory and to execute at least one instruction stored in the memory,
   wherein the processor is configured to,
      retrieve an image thumbnail extracted from a game video being broadcast live,
      determine whether the image thumbnail is a game thumbnail or an advertisement thumbnail using a pre-trained deep learning model,
      in response to a determination result indicating the image thumbnail is the game thumbnail, display the game thumbnail on a display screen, and
      in response to the determination result indicating the image thumbnail is the advertisement thumbnail, remove the advertisement thumbnail on the display screen,
   wherein the pre-trained deep learning model is implemented by,
      acquiring a plurality of image thumbnails from the game video,
      classifying the acquired image thumbnails into game thumbnails and advertisement thumbnails,
      training a deep learning model based on the game thumbnails and the advertisement thumbnails, and
      running a test on the pre-trained deep learning model, and
   wherein the pre-trained deep learning model is implemented by, if a ratio of a number of the game thumbnails to a number of the advertisement thumbnails exceeds a range, generating at least one advertisement thumbnail based on at least one of the advertisement thumbnails and increasing the number of the advertisement thumbnails, and training the deep learning model based on the number of the game thumbnails and the increased number of the advertisement thumbnails.

9. The electronic device of claim 8, wherein the pre-trained deep learning model comprises:

a preprocessing model configured to extract at least one feature point from the image thumbnail; and a classification model configured to analyze the feature point and to determine whether the image thumbnail is the game thumbnail or the advertisement thumbnail.

10. The electronic device of claim 8, wherein the processor is configured to retrieve one of the plurality of image thumbnails extracted from the game video and stored over time, the plurality of image thumbnails including the image thumbnail.

11. The electronic device of claim 10, wherein the processor is configured to retrieve one of the image thumbnails at a time interval.

12. The electronic device of claim 8, wherein the pre-trained deep learning model is trained using another game video corresponding to a same event as that of the game video being broadcast live, as training data.

13. The electronic device of claim 8, wherein the deep learning model is trained based on a portion of the game thumbnails and a portion of the advertisement thumbnails, and the test is run on the pre-trained deep learning model based on a remaining portion of the game thumbnails and a remaining portion of the advertisement thumbnails.

\* \* \* \* \*